United States Patent [19]

Iyoda

[11] Patent Number: 5,399,958

[45] Date of Patent: Mar. 21, 1995

[54] SWITCHING POWER SUPPLY CIRCUIT HAVING A REDUCED RIPPLE VOLTAGE

[75] Inventor: Moritaka Iyoda, Tokyo, Japan

[73] Assignee: NEC Corporation, Tokyo, Japan

[21] Appl. No.: 251,045

[22] Filed: May 31, 1994

[30] Foreign Application Priority Data

May 31, 1993 [JP] Japan ................................. 5-127653

[51] Int. Cl.$^6$ ............................................... G05F 1/40
[52] U.S. Cl. .................................................. 323/282
[58] Field of Search ............... 323/282, 285, 286, 287;
363/45, 46, 78, 80; 331/18, 25

[56] References Cited

U.S. PATENT DOCUMENTS

| | | | |
|---|---|---|---|
| 4,161,771 | 7/1979 | Bates | 363/43 |
| 4,302,717 | 11/1981 | Olla | 323/282 |
| 4,553,082 | 11/1985 | Nesler | 323/282 |
| 4,743,864 | 5/1988 | Nakagawa et al. | 331/25 |

OTHER PUBLICATIONS

Motorola Inc., Linear/Switchmode Voltage Regulator Handbook, 4th Edition, 1989.

Primary Examiner—Steven L. Stephan
Assistant Examiner—Matthew V. Nguyen
Attorney, Agent, or Firm—Whitham, Curtis, Whitham & McGinn

[57] ABSTRACT

A switching power supply circuit comprising a switching element receiving an electric power from an primary power supply for outputting the received electric power, a smoothing circuit receiving an output of the switching element, a voltage divider receiving a smoothed electric power outputted from the switching element for generating a voltage signal, a comparator having a first input receiving the voltage signal and a second input receiving a reference voltage, for generating a comparison result signal indicating whether or not the voltage signal is larger than the reference voltage, an AND circuit receiving the comparison result signal and a reference oscillation signal, a driver circuit receiving a logical signal from the AND circuit for driving the switching element on the basis of the logical signal, and a feedback circuit receiving the logical signal for feeding back the logical signal to the first input of the comparator. Thus, the ON and OFF of the switching element are alternately performed in each one cycle of the reference oscillation frequency while maintaining a stable switching duty, so that the output voltage can be maintained substantially constant, with a minimized output voltage ripple.

4 Claims, 4 Drawing Sheets

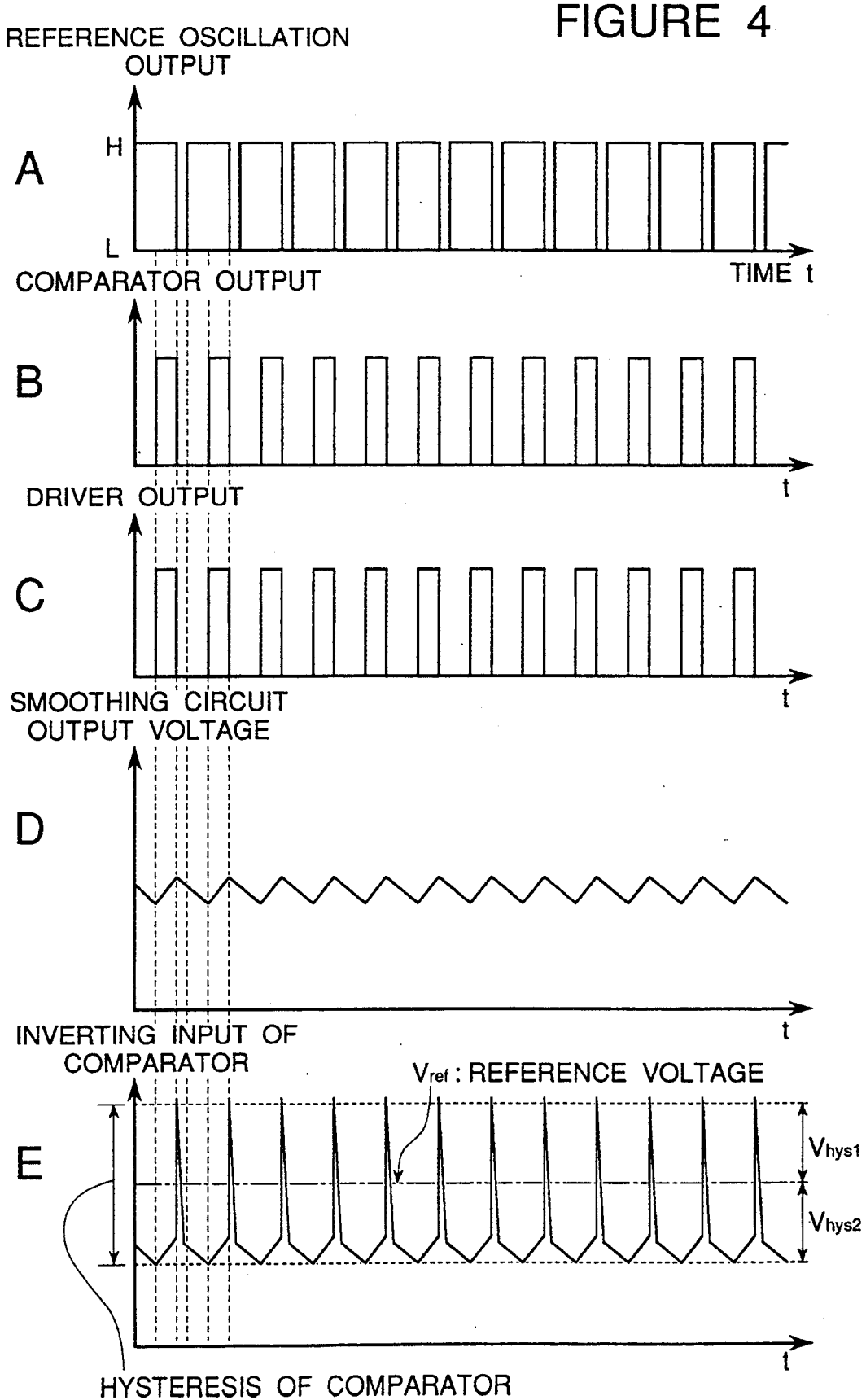

SWITCHING POWER SUPPLY CIRCUIT HAVING A REDUCED RIPPLE VOLTAGE

BACKGROUND OF THE INVENTION

1. Field of the invention

The present invention relates to a switching power supply circuit.

2. Description of related art

Referring to FIG. 1, there is shown a block diagram illustrating a typical example of a conventional switching power supply circuit. The shown switching power supply circuit is generally designated with Reference Numeral 100, and has an input terminal 110 connected to a primary power supply 200 and an output terminal 120 connected to a load 300. The shown switching power supply circuit 100 includes a controlled switching element 20 connected at its one end to the input terminal 110 so as to receive an electric power from the primary power supply 200, and a smoothing circuit 30 having an input connected to the other end of the controlled switching element 20' and an output connected to the output terminal 120 so as to supply a regulated direct current to the load 300.

The output of the smoothing circuit 30 is also supplied to a voltage conversion circuit 40, where the regulated direct current is converted into a voltage, which is in turn supplied to an inverting input of a comparator 60. A non-inverting input of the comparator 60 is connected to receive a reference voltage from a reference voltage circuit 50. The comparator 60 outputs a voltage signal indicative of which is larger, the regulated direct current voltage or the reference voltage. The voltage signal outputted from the comparator 60 is supplied to an AND circuit (logical product circuit) 80, which also receives a reference oscillation signal from a reference oscillation circuit 70. An output of the AND circuit 8 is supplied to a driver circuit 90 so that the output of the AND circuit 8 is power-amplified. Thus, the driver circuit 90 controls an ON/OFF of the switching element 20 on the basis of the output of the AND circuit 80.

As regards the above mentioned conventional switching power supply circuit, reference can be made to for example "Japanese Translation Version of Motorola: Linear/Switch Mode Voltage Regulator Bankbook", Chapter 13, Jun. 10, 1988.

Now, operation of the circuit shown in FIG. 1 will be described with reference to FIG. 2, which shows a timing chart illustrating voltage change on various points in the circuit shown in FIG. 1.

First, it should be noted that the input of the comparator 60 incorporated in the switching power supply circuit has a voltage hysteresis on the order of several millivolts due to variations in circuit element characteristics and in circuit construction. As is illustrated in the waveform E of FIG. 2, this input hysteresis voltage is extended around the reference voltage $V_{ref}$ of the reference voltage circuit 50. Here, a high side input hysteresis voltage is expressed as $V_{ref}+V_{hys1}$, where $V_{hys1}$ is a difference between the high side input hysteresis voltage and the reference voltage, and a low side input hysteresis voltage is expressed as $V_{ref}-V_{hys2}$, where $V_{hys2}$ is a difference between the low side input hysteresis voltage and the reference voltage. Therefore, the hysteresis voltage width or magnitude can be expressed as $V_{hys1}+V_{hys2}$.

In this condition, if the output voltage of the voltage conversion circuit 40 is lower than the reference voltage of the reference voltage circuit 50, the comparator 60 continues to output a high level signal (H) until the output voltage of the voltage conversion circuit 40 becomes higher than $V_{ref}+V_{hys1}$, as shown in the waveform B of FIG. 2. During this period, therefore, the output oscillation signal of the reference oscillation circuit 70 as shown in the waveform A of FIG. 2 is supplied to the driver circuit 90 for driving the switching element 20, so that the switching element 20 is forcibly intermittently turned on at the timing defined by the output oscillation signal of the reference oscillation circuit 70, as shown in the waveform C of FIG. 2. At this time, the switching duty becomes a maximum.

When the switching element 20 is driven with the maximum switching duty, the output voltage of the switching voltage supply circuit 100 gradually elevates as shown in the waveform D of FIG. 2. When the output voltage of the voltage conversion circuit 40 becomes higher than $V_{ref}+V_{hys1}$ as shown in the waveform E of FIG. 2, the comparator 60 becomes to output a low level signal (L), with the result that the switching element 20 is turned off. Accordingly, the output voltage of the switching voltage supply circuit 100 gradually drops with time as shown in the waveform D of FIG. 2. The off condition of the switching element 20 is maintained until the output voltage of the voltage conversion circuit 40 becomes lower than $V_{ref}-V_{hys2}$.

When the output voltage of the voltage conversion circuit 40 becomes lower than $V_{ref}-V_{hys2}$ as shown in the waveform E of FIG. 2 as the result of the continuous off condition of the switching element 20, the output of the comparator 60 flips so that the comparator 60 outputs the high level signal, again. As the result of the output change of the comparator 60, the switching element 20 are intermittently turned on with the duty determined by the logical product between the output of the reference oscillation circuit 70 and the output of the comparator 60. Namely, after the output of the comparator 60 becomes the high level signal, again, the switching element 20 is switched to have the maximum duty.

The above mentioned sequential operation is repeated, with the result that the output voltage of the switching voltage supply circuit 100 is maintained substantially at a constant level.

As will seen from the above, however, because of the input voltage hysteresis (on the order of several millivolts) of the comparator used in the switching voltage supply circuit 100, the switching element is, in some case, controlled to have the maximum switching duty during a period of a few cycles of the reference oscillation frequency, and on the other hand to be completely maintained in rite off condition during another period of a few cycles of the reference oscillation frequency.

Under this operating condition, a peak value of the current flowing through the switching element and circuit elements which constitute the smoothing circuit will increase, with the result that the amount of heat generated by those elements correspondingly increases. In addition, a tipple voltage in the output voltage of the switching power supply circuit is larger, as will be apparent from the waveform D of FIG. 2.

SUMMARY OF THE INVENTION

Accordingly, it is an object of the present invention to provide a switching power supply circuit which has overcome the above mentioned defect of the conventional one.

Another object of the present invention is to provide a switching power supply circuit configured to have a switching element which is alternately tamed on and off in each one cycle of a reference oscillation frequency so as to have an appropriate duty, even under a condition in which the switching element would have otherwise been controlled under the influence of the hysteresis of the comparator to have the maximum switching duty during a period of a few cycles of the reference oscillation frequency and then to be completely maintained in the off condition during another period of a few cycles of the reference oscillation frequency.

The above and other objects of the present invention are achieved in accordance with the present invention by a switching power supply circuit comprising a switching element receiving an electric power from an primary power supply for outputting the received electric power when the switching element is turned on, a smoothing circuit receiving an output of the switching element for outputting a smoothed electric power, a voltage conversion circuit receiving the smoothed electric power outputted from the switching element for converting the smoothed electric power into a voltage signal, a comparator having a first input receiving the voltage signal and a second input receiving a reference voltage, for generating a comparison result signal indicating whether or not the voltage signal is larger than the reference voltage, a logical product circuit receiving the comparison result signal and a reference oscillation signal for outputting a logical signal indicative of the logical product between the comparison result signal and the reference oscillation signal, a driver circuit receiving the logical signal for driving the switching element on the basis of the logical signal, and a feedback circuit receiving the logical signal for feeding back the logical signal to the first input of the comparator.

The above and other objects, features and advantages of the present invention will be apparent from the following description of preferred embodiments of the invention with reference to the accompanying drawings.

BRIEF DESCRIPTION OF THE DRAWINGS

FIG. 4 is a timing chart illustrating a voltage change on various points in the switching power supply circuit shown in FIG. 3.

DESCRIPTION OF THE PREFERRED EMBODIMENTS

Figure 1:
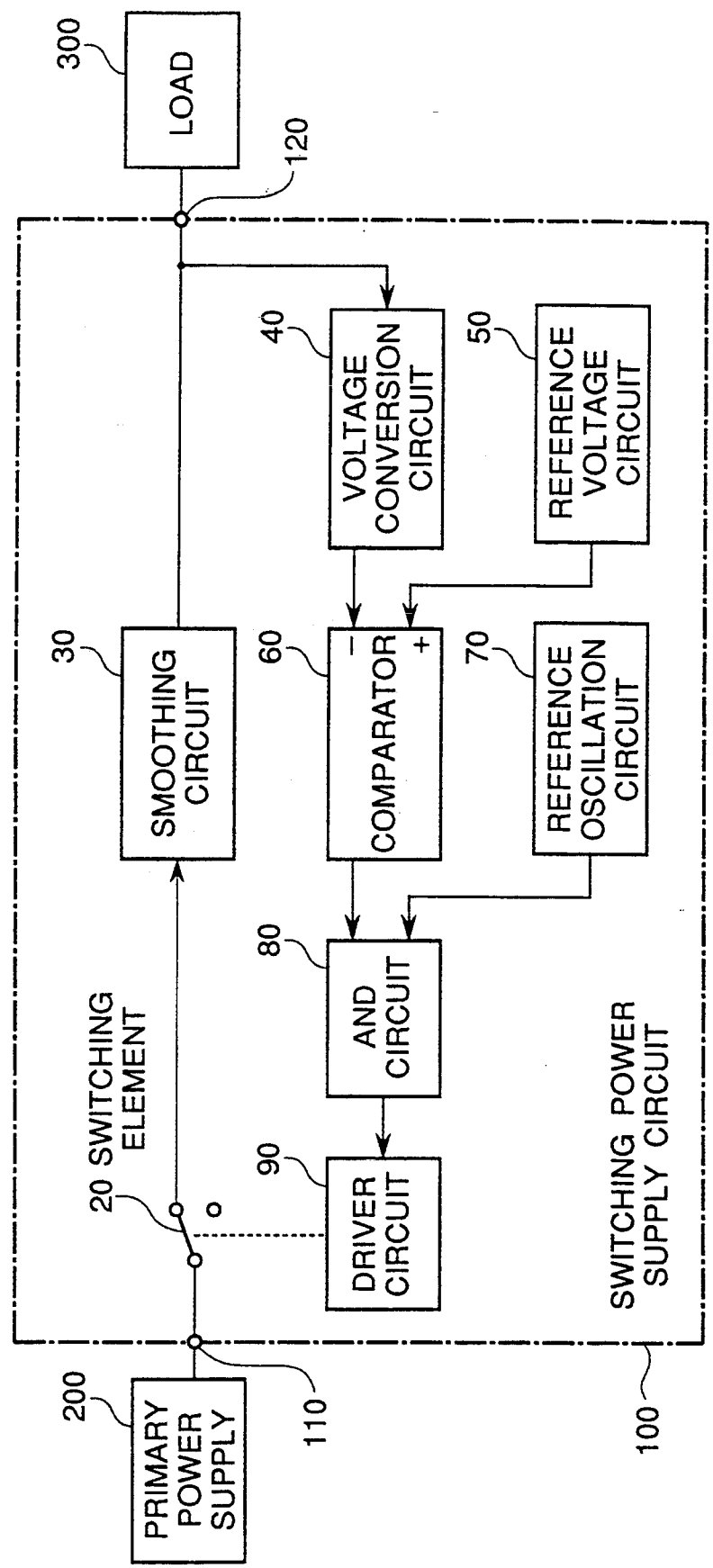
FIG. 1 is a block diagram illustrating a typical example of a conventional switching power apply circuit.
Figure 3:
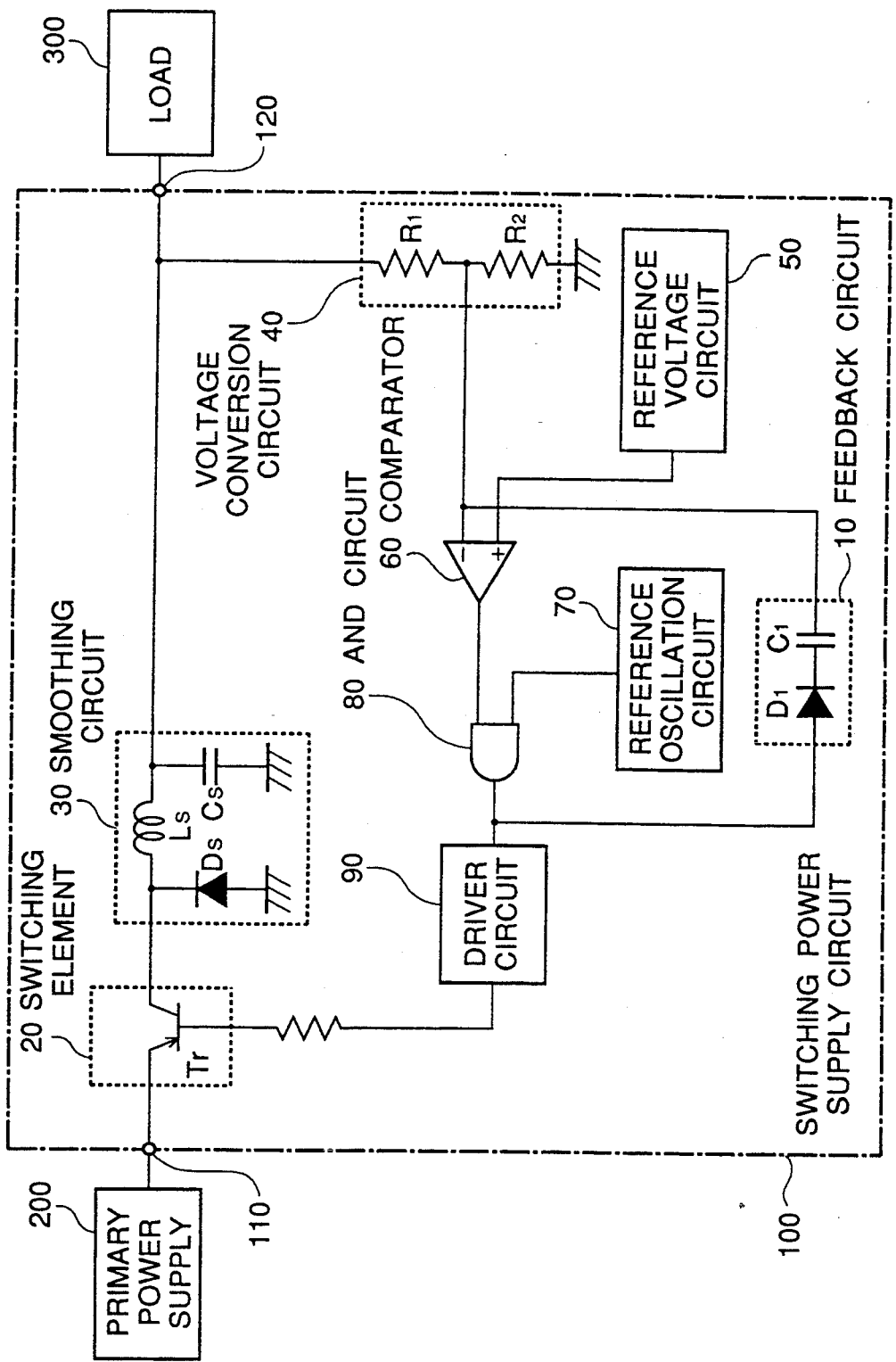
FIG. 3 is a block diagram illustrating one embodiment of the switching power supply circuit in accordance with the present invention.

Referring to FIG. 3, there is shown a block diagram illustrating one embodiment of the switching power supply circuit in accordance with the present invention. In FIG. 3, elements corresponding to those shown in FIG. 1 are given the same Reference Numerals.

The switching power supply circuit 100 shown in FIG. 3 is connected at its input terminal 110 to a primary power supply 200 and at its output terminal 120 to a load 300. The switching power supply circuit 100 includes a controlled switching element 20, which can be formed of a PNP transistor Tr having an emitter connected to the input terminal 110 so as to receive an electric power from the primary power supply 200. A smoothing circuit 30 having an input connected to the controlled switching element 20, is composed of, for example, a voltage regulation Zener diode Ds having a cathode connected to a collector of the transistor Tr and an anode connected to the ground, an inductor Ls connected at its end to the collector of the transistor Tr and at its other end to the output terminal 120, and a capacitor Cs connected between the other end of the inductor Ls and the ground. The inductor Ls and the capacitor Cs cooperate to smooth the pulsating current supplied through the switching element 20, so as to supply a regulated direct current through the output terminal 120 to the load 300.

A part of the regulated direct current smoothed by the smoothing circuit 30 is supplied to a voltage conversion circuit 40, which is composed of for example of a voltage divider formed of a series-connected resistors $R_1$ and $R_2$ connected between the output terminal 120 and the ground. From a connection node between the series-connected resistors $R_1$ and $R_2$, there can be obtained a voltage signal indicative of the regulated direct current voltage, namely, the output voltage of the switching power supply circuit 100.

This voltage signal is supplied to an inverting input of a comparator 60. A non-inverting input of the comparator 60 is connected to receive a reference voltage $V_{ref}$ from a reference voltage circuit 50. The comparator 60 outputs a voltage signal indicating whether or not the regulated direct current voltage is larger than the reference voltage. The voltage signal outputted from the comparator 60 is supplied to an AND circuit 80, which also receives a reference oscillation signal from a reference oscillation circuit 70. A logical signal outputted from the AND circuit 80 is supplied to a driver circuit 90 so that the output of the AND circuit 80 is power-amplified. The power-amplified logical signal, namely, a driving signal is applied through a resistor to a base of the PNP transistor Tr. Accordingly, the driver circuit 90 controls an ON/OFF, namely, a switching duty, of the switching element 20 (PNP transistor Tr) on the basis of the output of the AND circuit 80, so that the output voltage of the switching power supply circuit is maintained substantially constant.

Furthermore, according to the present invention, there is provided a feedback circuit 10 connected between the output of the AND circuit 80 and the inverting input of the comparator 60, so that the output of the AND circuit 80 is converted in waveform and then superimposed on the voltage signal outputted from the voltage conversion circuit 40 applied to the inverting input of the comparator 60 (negative feedback). This feedback circuit 10 can be formed of a diode $D_1$ having its anode connected to the output of the AND circuit 80 and a capacitor $C_1$ connected at its end to a cathode of the diode $D_1$ and at its other end to the inverting input of the comparator 60.

Now, operation of the circuit shown in FIG. 3 will be described with reference to FIG. 4, which shows a timing chart illustrating voltage change on various points in the circuit shown in FIG. 3.

First, assume that the load 300 connected to the output terminal 120 of the switching power supply circuit 100 is constant, and therefore, the switching operation is in a steady condition. In this steady condition, during a period of time in which the oscillation signal of the reference oscillation circuit 70 as shown in the waveform A of FIG. 4 is at a high level (H), the switching element 20 (PNP transistor Tr) is turned on, so that the output voltage of the switching power supply circuit elevates as shown in the waveform D of FIG. 4. If the oscillation signal of the reference oscillation circuit 70 is brought from the high level (H) to a low level (L), the driver circuit 90 bring its output signal to a low level as shown in the waveform C of FIG. 4, so as to cause the switching element 20 (PNP transistor Tr) to turn off, regardless of the output level of the comparator 60.

Change of the output of the driver circuit 90, hence the output of the AND circuit 80, is converted in waveform, and then, superimposed on the inverting input of the comparator 60. Here, it is previously adjusted to the effect that a peak voltage of the signal superimposed on the inverting input of the comparator 60 is substantially larger than the hysteresis voltage width (namely, $V_{hys1}+V_{hys2}$) of the comparator 60. With this arrangement, when the switching element 20 is caused to turn off, the signal superimposed on the inverting input of the comparator 60 by the feedback circuit 10 immediately makes the voltage on the inverting input of the comparator 60 larger than $V_{ref}+V_{hys1}$, as shown in the waveform E of FIG. 4, so that the output of the comparator is caused to be flipped from the high level to the low level as shown in the waveform B of FIG. 4.

If the switching element 20 is off, the output voltage of the switching power supply circuit decreases with time as shown in the waveform D of FIG. 4, and therefore, the voltage signal outputted from the voltage conversion circuit correspondingly drops with time. In the course in which the voltage signal of the voltage conversion circuit continues to drop, the output of the reference oscillation circuit changes from the low level to the high level as shown in the waveform A of FIG. 4. At this time, however, the voltage signal of the voltage conversion circuit has not yet become lower than $V_{ref}-V_{hys2}$, and therefore, the output voltage of the comparator 60 is maintained at the low level. As a result, although the output of the reference oscillation circuit has changed from the low level to the high level, the switching element 20 is in no way tamed on, and namely, is still maintained off.

With further continuation of the OFF condition of the switching element, the output voltage of the switching power supply circuit further decreases, so that the voltage signal of the voltage conversion circuit gradually approaches $V_{ref}-V_{hys2}$. When the voltage signal of the voltage conversion circuit becomes lower than $V_{ref}-V_{hys2}$ as shown in the waveform E of FIG. 4, the output of the comparator 60 changes from the low level to the high level.

At this time, since the output voltage of the reference oscillation circuit 70 has already become the high level, the AND circuit 80 outputs a high level signal to the driver circuit 90 so that the driver circuit 90 causes the switching element 20 to turn on. As a result, during the remaining high level period of the output voltage of the reference oscillation circuit 70 as shown in the waveform A of FIG. 4, the switching element 20 is maintained in the ON condition as shown in the waveform C of FIG. 4, so that the voltage signal of the voltage conversion circuit gradually elevates, again as shown in the waveform D of FIG. 4.

The above mentioned sequential operation is repeatedly performed, with the result that the ON and OFF of the switching element are alternately performed in each one cycle of the reference oscillation frequency with an appropriate duty as shown in FIG. 4, without being influenced by the hysteresis of the comparator. Accordingly, as shown in the waveform D of FIG. 4, the ripple in the output voltage of the switching power supply circuit can be effectively minimized.

Next, explanation will be made on operation in the case that the condition of the load 300 connected to the output terminal of the switching voltage supply circuit 100 changes. The following is the case in which the current flowing through the load 300 increases.

As mentioned above, when the load condition is constant, the switching element 20 is caused to alternately mm on and off in each one cycle with a predetermined switching duty. Under this steady condition, if the current flowing through the load 300 increases, an inclination of the drop per time in the output voltage of the switching voltage supply circuit during the OFF period of the switching element becomes large. With this enlarged inclination of the output voltage drop, the output voltage of the voltage conversion circuit becomes lower than $V_{ref}-V_{hys2}$ with a time which is shorter than that required until the output voltage of the voltage conversion circuit becomes lower than $V_{ref}-V_{hys2}$ when the current flowing through the load 300 has not yet increased. Accordingly, the OFF period of the switching element is shortened. On the other hand, since the reference oscillation frequency is constant, the shortening of the OFF period of the switching element results in elongation of the ON period of the switching element. As a result, when a load current increases, the switching duty is made large, so that the output voltage of the switching power supply circuit can be maintained substantially constant.

It could be understood to persons skilled in the art from the above description that, if a load current decreases, the OFF period of the switching element is elongated, which results in a shortening of the ON period of the switching element, so that the switching duty is made small, and therefore, the output voltage of the switching power supply circuit can be maintained substantially constant.

As will be apparent from the above explanation, when the load changes, the switching duty is modified so as to compensate for the change of the load. At this time, the ON and OFF of the switching element are alternately performed in each cycle of the reference oscillation frequency while maintaining the modified switching duty. Accordingly, the output voltage of the switching power supply circuit can be maintained substantially constant with a minimized output voltage ripple.

In addition, since the ON and OFF of the switching element are alternately performed in each cycle of the reference oscillation frequency, the switching clement serves to suppress the peak value of the current flowing through the circuit elements of the smoothing circuit, and therefore, the amount of heat generated in the circuit elements can be effectively reduced.

Figure 2:
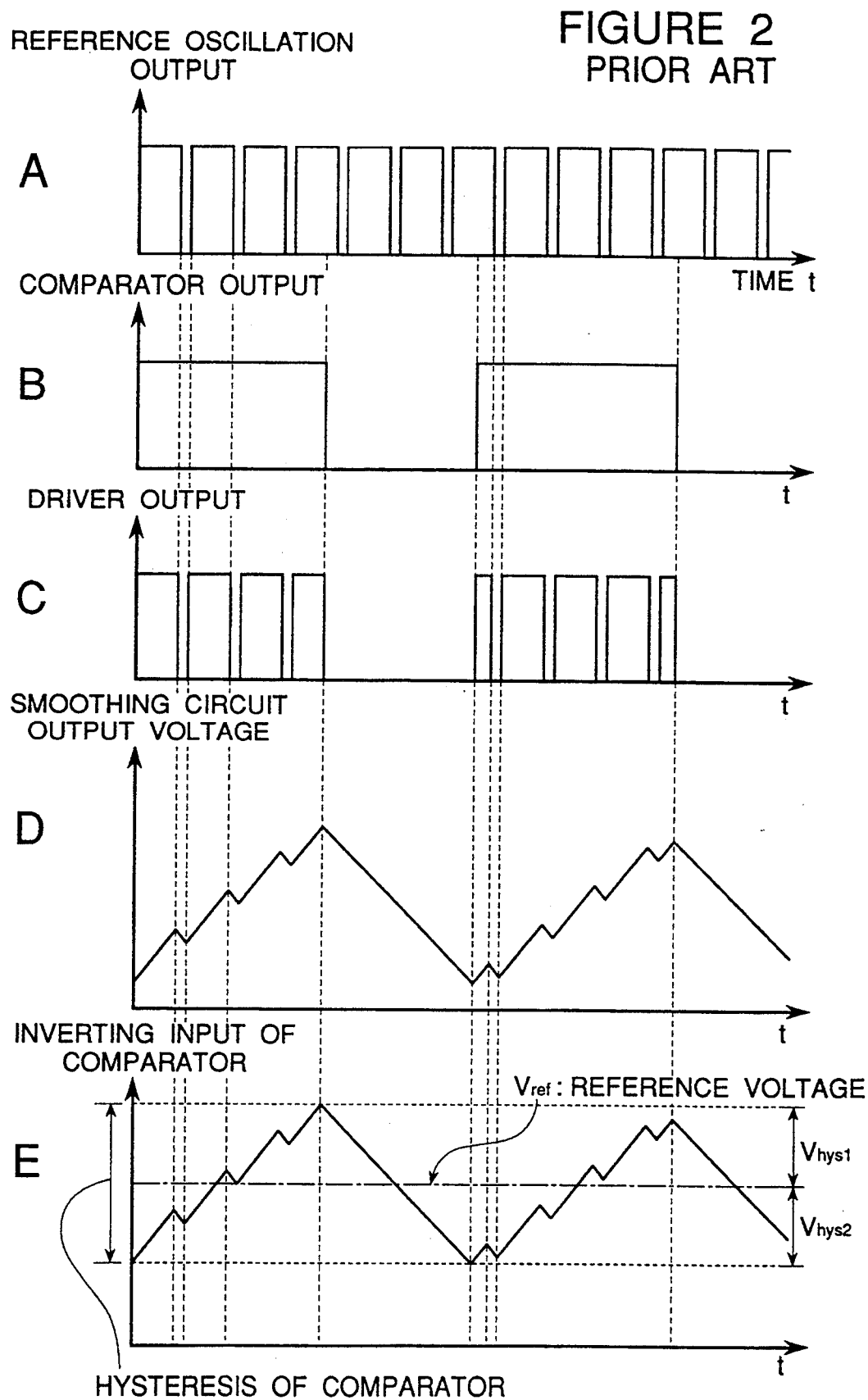
FIG. 2 is a timing chart illustrating a voltage change on various points in the circuit shown in FIG. 1.

An actual circuit was tested by changing the circuit construction from FIG. 1 to FIG. 3. Under a given input/output condition the peak-to-peak value of the current flowing the switching element was remarkably reduced from 3.0 Ap-p to 0.5 Ap-p, and the temperature increase of the circuit elements was greatly suppressed from 70° C. to 30° C. In addition, the ripple voltage of the output voltage was decreased from 50 mVp-p to 30 mVp-p.

The invention has thus been shown and described with reference to the specific embodiments. However, it should be noted that the present invention is in no way limited to the details of the illustrated structures but changes and modifications may be made within the scope of the appended claims.

I claim:

1. A switching power supply circuit comprising a switching element receiving an electric power from an primary power supply for outputting the received electric power when said switching element is turned on, a smoothing circuit receiving an output of said switching element for outputting a smoothed electric power, a voltage conversion circuit receiving the smoothed electric power outputted from said switching element for converting said smoothed electric power into a voltage signal, a comparator having a first input receiving said voltage signal and a second input receiving a reference voltage, for generating a comparison result signal indicating whether or not said voltage signal is larger than said reference voltage, a logical product circuit receiving said comparison result signal and a reference oscillation signal for outputting a logical signal indicative of the logical product between said comparison result signal and said reference oscillation signal, a driver circuit receiving said logical signal for driving said switching element on the basis of said logical signal, and a feedback circuit receiving said logical signal for feeding back said logical signal to said first input of said comparator.

2. A switching power supply circuit claimed in claim 1 wherein said feedback circuit is configured to convert said logical signal in waveform.

3. A switching power supply circuit as claimed in claim 1 wherein said comparator has such an input voltage hysteresis that when a voltage on said first input becomes higher than $V_{ref}+V_{hys1}$, said comparator outputs a logical low level signal and when the voltage on said first input becomes smaller than $V_{ref}-V_{hys2}$, said comparator outputs a logical high level signal, and said feedback circuit is configured so that a peak voltage of said signal superimposed on said first input of said comparator is larger than the hysteresis voltage width $V_{hys1}+V_{hys2}$ of said comparator, where $V_{ref}$ is said reference voltage, $V_{ref}+V_{hys1}$ is a high side input hysteresis voltage, $V_{ref}-V_{hys2}$ is a low side input hysteresis voltage, and $V_{hys1}+V_{hys2}$ is the input voltage hysteresis width of said comparator.

4. A switching power supply circuit as claimed in claim 3 wherein said feedback circuit includes a diode having its anode connected to the output of said logical product circuit and a capacitor connected at its end to a cathode of said diode and its other end to said inverting input of said comparator.

* * * * *